(12) United States Patent
Knutson et al.

(10) Patent No.: US 12,175,104 B2
(45) Date of Patent: Dec. 24, 2024

(54) OFFSET-BASED MEMORY MANAGEMENT FOR INTEGRATED CIRCUITS AND PROGRAMMABLE NETWORK DEVICES

(71) Applicant: T-Mobile Innovations LLC, Overland Park, KS (US)

(72) Inventors: Austin Knutson, Overland Park, KS (US); Brian Waters, Angel Fire, NM (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/392,086

(22) Filed: Dec. 21, 2023

(65) Prior Publication Data

US 2024/0126456 A1 Apr. 18, 2024

Related U.S. Application Data

(62) Division of application No. 17/396,885, filed on Aug. 9, 2021, now Pat. No. 11,893,250.

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
CPC .... G06F 3/0631; G06F 3/0604; G06F 3/0659; G06F 3/0679; G06F 12/0223; G06F 2212/1016; G06F 2212/1044; G06F 12/023; G06F 9/5016
See application file for complete search history.

(56) References Cited

U.S. PATENT DOCUMENTS

| | | | |
|---|---|---|---|
| 7,454,587 B1 | 11/2008 | Kulkarni et al. | |
| 8,527,544 B1* | 9/2013 | Colgrove | G06F 3/0641 |
| | | | 707/791 |
| 10,503,551 B2 | 12/2019 | Dube et al. | |
| 11,516,719 B1 | 11/2022 | Sung | |
| 2003/0172226 A1* | 9/2003 | Jolly | G06F 3/061 |
| | | | 711/111 |
| 2016/0274814 A1* | 9/2016 | Zhang | G06F 3/0664 |
| 2019/0171601 A1 | 6/2019 | Nachimuthu et al. | |
| 2019/0266100 A1* | 8/2019 | Mello | G06F 12/0246 |
| 2020/0097392 A1* | 3/2020 | Pizlo | G06F 12/0284 |
| 2020/0257557 A1 | 8/2020 | Ichiba | |
| 2020/0371700 A1* | 11/2020 | Stabrawa | G06F 3/0631 |
| 2021/0294506 A1 | 9/2021 | Tadokoro | |
| 2023/0015979 A1* | 1/2023 | Luo | G06F 3/067 |

* cited by examiner

*Primary Examiner* — Sean D Rossiter
(74) *Attorney, Agent, or Firm* — Jones Robb, PLLC

(57) ABSTRACT

Integrated circuits that perform offset-based memory management using offset values for allocated, de-allocated, and free memory portions. An example method includes receiving a first request for allocating a first portion of a memory module coupled to an integrated circuit, and determining a first address space for allocating the first portion of the memory module based on one or more offset values.

20 Claims, 14 Drawing Sheets

Second allocation (10 bytes)

501 →
Management Info

| | |
|---|---|
| Memory Size | 96 bytes |
| Base Memory Address | 0x1234 |
| Current Allocation Offset | 0x18 |
| Free List 8 bytes | null |
| Free List 16 bytes | null |
| Free List 32 bytes | null |

Deallocate another block

501 ⟶

Management Info

| | |
|---|---|
| Memory Size | 96 bytes |
| Base Memory Address | 0x1234 |
| Current Allocation Offset | 0x50 |
| Free List 8 bytes | 0x38 |
| Free List 16 bytes | null |
| Free List 32 bytes | null |

Allocate a 16-byte block

| Management Info | |
|---|---|
| Memory Size | 96 bytes |
| Base Memory Address | 0x1234 |
| Current Allocation Offset | 0x60 |
| Free List 8 bytes | 0x38 |
| Free List 16 bytes | null |
| Free List 32 bytes | null |

Allocate an 8-byte block

501 → Management Info

| Memory Size | 96 bytes |
|---|---|
| Base Memory Address | 0x1234 |
| Current Allocation Offset | 0x60 |
| Free List 8 bytes | 0x38 |
| Free List 16 bytes | null |
| Free List 32 bytes | null |

OFFSET-BASED MEMORY MANAGEMENT FOR INTEGRATED CIRCUITS AND PROGRAMMABLE NETWORK DEVICES

This patent application is a continuation of U.S. patent application Ser. No. 17/396,885, filed on Aug. 9, 2021, which is incorporated by reference in its entirety for all purposes.

TECHNICAL BACKGROUND

Integrated circuits such as field programmable gate arrays (FPGAs) are increasingly being deployed in networks to enable processing of data packets, data sessions, etc. Programmable network devices that include such integrated circuits typically include components such as programmable logical modules and memories, and other components such as interfaces, etc. High-level synthesis (HLS) can be used to write code to operate such integrated circuits, similar to an operating system. However, the components of such integrated circuits (e.g. FPGAs) are limited to specific applications, and therefore do not compare to the circuitry of more general-purpose computers, which include compiling and running more robust operating systems and various applications. For example, instead of an operating system, a basic memory manager circuit (or logical module) is used to organize a memory and create address spaces for storing specific portions of code or logic. There is a limitation in the usage of pointers that identify these address spaces, and therefore calling or switching to different portions of code/logic defining operations stored on a memory portion or memory block. Pointers can thus be associated with a piece of code stored on the block of memory at a given address space. However, keeping track of the address space has been known to be buggy, particularly at different optimization levels used for compiling the high-level instructions into circuit-executable code. For example, the size and complexity limitations on current FPGAs force programmers using HLS to compromise optimization level with generating problematic code. Further, current memory management techniques poorly track memory blocks of different sizes. For example, when memory blocks or portions are divided into allocations, then de-allocated and re-allocated a few times, some memory is wasted/orphaned. More normal or general-purpose operating systems perform more transparent memory management, which can be optimized by defragmentation, etc., such features don't currently exist on integrated circuits, nor are they feasible given the hardware limitations.

In a specific existing example involving control and user plane separation (CUPS) in modern wireless networks, FPGAs and related devices are used for processing data packets associated with different data sessions, with tens of thousands of different types of data sessions traversing such programmable network devices on a daily basis. The amount of configuration data associated with the myriad data sessions expands and contracts, requiring frequent memory allocation, deallocation, and reuse. For example, different types of data sessions being controlled from different network nodes (including via different interfaces) require ongoing updating of packet detection rules (PDRs) and quality of service (QoS) policies to be applied to the different data sessions. This can also change on a frequent and/or unpredictable basis, depending upon the needs of wireless devices (e.g. UEs) or other devices accessing network services. For example, a wireless device engaged in a data session may initiate a voice call, which utilizes a different type of data network (e.g. VoIP). Additional rules would be generated so that the wireless network can identify the voice packets from the wireless device and get them over to the appropriate destination, versus the data session packets. Thus, in these situations, efficient memory management and memory reuse is essential to avoid wasting memory.

OVERVIEW

Exemplary embodiments described herein include integrated circuits that perform offset-based memory management using offset values for allocated, de-allocated, and free memory portions. An example method performed by the disclosed devices and systems includes receiving a first request for allocating a first portion of a memory module coupled to an integrated circuit, and determining a first address space for allocating the first portion of the memory module based on one or more offset values.

Another example method includes initializing a memory manager module of an integrated circuit with a size and a starting address of a memory module coupled to the integrated circuit, receiving a request to allocate a portion of the memory module for a code segment of a given size, determining, based on looking up an offset value in a linked list, whether a past portion of the memory module corresponding to the given size was previously de-allocated, if the offset value exists, allocating the past portion for the code segment and updating the offset value in the linked list, and if the offset value is null, allocating the portion of the memory module for the code segment at the starting address and updating a current allocated offset value.

An example system described herein includes an integrated circuit comprising a plurality of logical modules, and a memory module coupled to the integrated circuit. At least one of the plurality of logical modules of the integrated circuit is configured to perform operations comprising storing offset values associated with each of a current allocation of portions of the memory module, a last de-allocated portion of the memory module, and previously de-allocated portions of the memory module, updating the offset values associated with the current allocation each time an additional portion of the memory module is allocated, and updating the offset values associated with the last de-allocated portion and the previously de-allocated portions each time an existing portion of the memory module is de-allocated.

DETAILED DESCRIPTION

Figure 1:
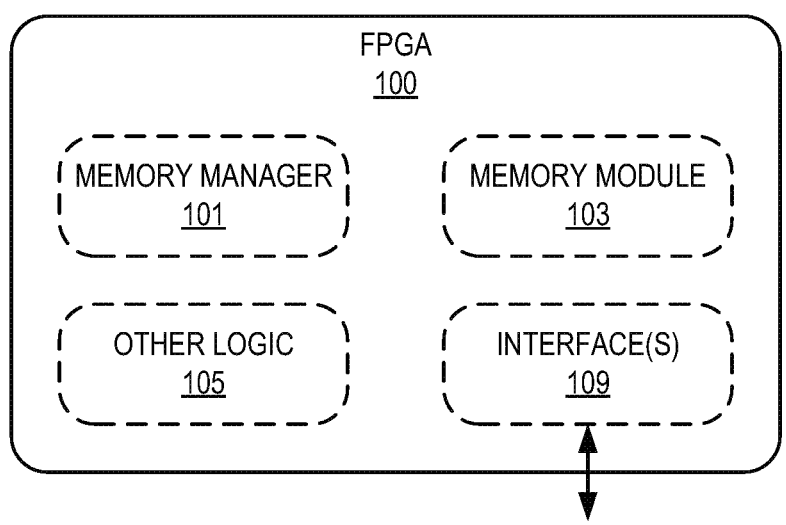
FIG. 1 depicts an example of a memory manager on a FPGA.

Example integrated circuits disclosed herein include FPGAs (and equivalent devices) programmed to perform offset-based memory management, with memory managers that utilize offset values to identify different portions of memory modules, and using lists to store different offset values associated allocated portions, de-allocations portions, and free portions of different sizes. Each separate memory on an FPGA has a "base address" to which one or more offset values can be added to arrive at a specific portion of the memory module. For example, an FPGA can be coupled to external memory modules, e.g. DDR4 memory. As separate code segments (e.g. for performing specific functions described herein) are stored on different portions of the memory modules (e.g. configurable logic blocks or CLBs), the described offset-based memory management methods enable more robust execution of the various specific functions versus using memory pointers. Further, storing only a few different offset values on the memory manager and/on different memory portions of specific (e.g. incremental) sizes can be used to create size-specific linked lists of offset values, which further enables rapid lookups for differently-sized sections of code and/or associated functions.

In a specific example involving networking, the described integrated circuits are provided within programmable networking devices for processing data packets traversing one or more networks. The programmable network devices may be provided on a compact and modular hardware unit to minimize excessive communication while maintaining control and user plane separation (CUPS). The programmable networking device can include one or more processors, memories, and one or more embedded hardware chips, such as FPGAs, GPUs, ASICs, memory modules, and so on. In examples described herein, instructions for performing the method are written using high level synthesis (HLS). For example, a HLS compiler translates C++ code to a hardware description language (HDL), which can be integrated into traditional FPGA design tools and workflow. In exemplary embodiments described herein, one or more host modules on a memory coupled to a processor can interface between an FPGA programmed with UPF functionality and a control plane network node or gateway. Many diverse uses and implementations can be envisioned for the novel programmable networking devices described herein. Any situation that requires high-speed low-latency packet processing can benefit from these programmable networking devices.

Therefore, an example method for offset-based memory management described herein includes receiving a first request for allocating a first portion of a memory module coupled to an integrated circuit, and determining a first address space for allocating the first portion of the memory module based on one or more offset values. The one or more offset values comprise one or more current allocation offset values or de-allocated offset values. The method further includes determining an allocation size from the first request. The allocation size can be an incremental size amount (e.g. 8, 16, 32, 64 . . . ) of any unit (e.g. bytes, MB, GB, etc.) that would fit or accommodate the code for which the allocation is being requested. The method includes looking up de-allocated offset values in a free list corresponding to the allocation size. For instance, one or more free lists can be defined, corresponding to different size increments, i.e. various lists may be created (in real-time or pre-defined) that include offset values for de-allocated portions. In some embodiments, the looking up de-allocated offset values of a list indicates if any previously de-allocated portions exist, as further described herein.

The method further includes determining that no de-allocated offset values exist in the free list, and determining the first address space based on a current offset value. Generally, the current offset value is indicative of the end-address of the last-allocated portion. However, the current offset value is null if no previous portions of the memory module have been allocated or if all previously allocated portions have been de-allocated. Therefore, the method can also include determining an initial base address of the memory module prior to allocating any portions of the memory module. The method can include determining that a de-allocated offset value exists in the free list, wherein determining the first address space for allocating the first portion of the memory module comprises adding the de-allocated offset value to an initial base address of the memory module; and allocating the first portion at the first address space. The method thus includes modifying a current allocation offset value to reflect the first address space (i.e. the end or "head" of the linked list); and modifying the free list with a second de-allocated offset value corresponding to at least one of a previous de-allocated portion or a null value. The method can further include determining to de-allocate the first portion based on, for example, finishing execution of a code segment, expiration of a timer, etc., de-allocating the first portion, and modifying the free list with a second de-allocated offset value corresponding to the first address space. In this situation, the method further includes storing a third de-allocated offset value for a previously de-allocated portion at the first address space (i.e. as a linked list).

In another example, a system is described as including an integrated circuit comprising a plurality of logical modules, and a memory module coupled to the integrated circuit, wherein at least one of the plurality of logical modules of the integrated circuit is configured to perform operations including storing offset values associated with each of a current allocation of portions of the memory module, a last de-allocated portion of the memory module, and previously de-allocated portions of the memory module, updating the offset values associated with the current allocation each time an additional portion of the memory module is allocated, and updating the offset values associated with the last de-allocated portion and the previously de-allocated portions each time an existing portion of the memory module is de-allocated. In this example, the operations further include receiving requests to allocate and de-allocate portions of the memory module. The requests to allocate the portions of the memory are for code segments of a requested size, and an allocated size of the portions is a predefined incremental size that is larger than the requested size. In other words, the allocated size corresponds to one of a plurality of predefined size increments.

In some embodiments, the sizes of the lists can be defined in real-time or periodically based on incoming requests for different sized portions. For example, each increment can include allocating the received sizes to powers of 2. Subsequent allocations of a similar size can use the allocated size (and offset values associated therewith). Therefore, when a block is used for a size, then released, it is reallocated to a similar size code segment. This overcomes variable-size free lists, which can suffer from fragmentation when recombined.

Further, the offset values associated with each last de-allocated portion is stored in a free list associated with the predefined incremental size corresponding to each last de-allocated portion. Further, the offset values associated with each previously de-allocated portion are stored in a respective prior de-allocated portion of the memory module. This forms a type of linked list, where a small number of values need to be maintained to provide address spaces over the entire memory. One value for the current total allocation, one value for each last de-allocated portion of a given size (in the free list associated with each predefined size), and various values for each prior de-allocated portion stored in the subsequently de-allocated portion (of the predefined size), with the last de-allocated portion being referenced by its respective offset value in the associated free list.

In this example system, the request can be received by a host module coupled to the integrated circuit. The integrated circuit comprises a field-programmable gate array (FPGA). A memory manager module (or CLB) on the integrated circuit is programmed to perform instructions including receiving a request to allocate a portion of the memory module for one or more code segments, e.g. for packet processing, pipeline processing, session management, routing, lookups (LUTs), etc., and performing offset-based memory management methods described herein. An example method performed in such a system can include initializing the memory manager module with a size and a starting address of a memory module coupled to the integrated circuit, receiving a request to allocate a portion of the memory module for a code segment of a given size, determining, based on looking up an offset value in a linked list, whether a past portion of the memory module corresponding to the given size was previously de-allocated, if the offset value exists, allocating the previously de-allocated portion for the code segment and updating the offset value in the linked list, and if the offset value is null, allocating the portion of the memory module for the code segment at the starting address and updating a current allocated offset value. This method can further include de-allocating the portion of the memory module, updating the current allocated offset value, and updating the linked list with an offset value based on the de-allocating. A free block offset value corresponding to deallocated block (in the memory address space) can be added to a free list corresponding to a size of the block. Further, offset value(s) associated with any prior free blocks can be stored in the deallocated block. If no prior free blocks exist at the time (e.g. if the memory module is freshly being allocated), then this offset value can be a null value.

In an example embodiment further described in detail herein, such a programmable networking device can perform user plane functions on data packets traversing a mobile network, as well as packet filtration at network edges, deep-packet inspection (DPI), secure fast transfer of transmitting detailed instructions (for high-frequency stock trading, for example), and so on. Deploying the hosts and FPGA in a single (or modular) rack unit enables secure packet processing at line rate. Further, examples of programmable networking devices described herein can be positioned or located at various points within a network topology depending on a network operator's requirement. For example, the programmable networking devices can enhance or replace the myriad existing packet gateways, such as a CUPS based user plane S-GW, P-GW, or SAE-GW in 4G networks, and user plane functions (UPF) in 5G networks. In an exemplary embodiment, a programmable networking device as described herein can be co-located with an access node, such as a gNodeB or eNodeB, such that data flows may directly egress from the user plane at the radio access network (RAN) to the destination network. For example, the programmable networking device can replace a user plane or data plane elements of a system architecture evolution (SAE) gateway in 4G networks, or can replace an intermediate UPF (iUPF) in 5G networks. This eliminates having to transport the data packets to central sites or networks.

FIG. 1 depicts an example of a memory manager 101 on a FPGA 100, which can further include one or more programmable logic gates or CLBs, including memory manager 101 and other logic 105, one or more memory modules 103 for storing instructions, and one or more interfaces 109. Generally the instructions stored on CLBs include single AND/OR functions as well as more complex functions that enable use of the FPGA 100 as a comprehensive multi-core processor optimized for particular workloads, e.g. network security, packet processing, video and imaging, to circuitry for computer, auto, aerospace, and military applications, in addition to electronics for specialized processing and more. The instructions can be in the form of code segments, kernels, programs, function calls, libraries, or any type of executable instructions for performing specific tasks, stored on some combination of memory manager 101, memory module 103, and other logic 105. The instructions may be programmed using a high-level programming language, such as C++ or equivalent, and can be compiled via HLS to translate C++ code to a hardware description language (HDL) or any form that can be embedded or integrated into the FPGA design.

Further, interface(s) 109 can include one or more ports for enabling input, output, and communication with different network nodes or devices. For example, if programmable networking device 130 is deployed in a mobile network, interface(s) 109 enable communication with access nodes or wireless devices (on the RAN), one or more gateways or functions on the core network, or any other network node on the PDN, including but not limited to application servers, session management, proxy, web server, media server, or end-user wireless devices coupled to another wireless network or RAN. In one embodiment, a programmable networking device can include a first set of ports associated with reference points for data transmission between different network nodes, and a second set of ports associated with reference points for control signal transmission between different network nodes. It will be understood that FPGA 100 can further include components that are not shown herein, but understood as being necessary to execute the operations and functions described below, including offset-based memory management. For example, FPGA 100 (and modules thereon) can be coupled to external memory modules not shown herein, e.g. DDR4 memory modules.

In one example, memory manager 101 can utilize offset values to identify different portions of memory module 103, and use lists to store different offset values associated allocated portions, de-allocations portions, and free portions of different sizes. Each separate memory module 103 (or other logic modules 105) has a "base address" to which one or more offset values can be added to arrive at a specific portion of the module. As separate code segments (e.g. for performing specific functions described herein) are stored on different portions of the memory module 103 and other logic modules 105, the offset-based memory management method using size-specific linked lists of offset values for allocated portions, de-allocated portions, and free portions, enables more robust execution of the various specific functions performed by FPGA 100, and further enables rapid lookups for differently-sized sections of code and/or associated functions.

Figure 2A:
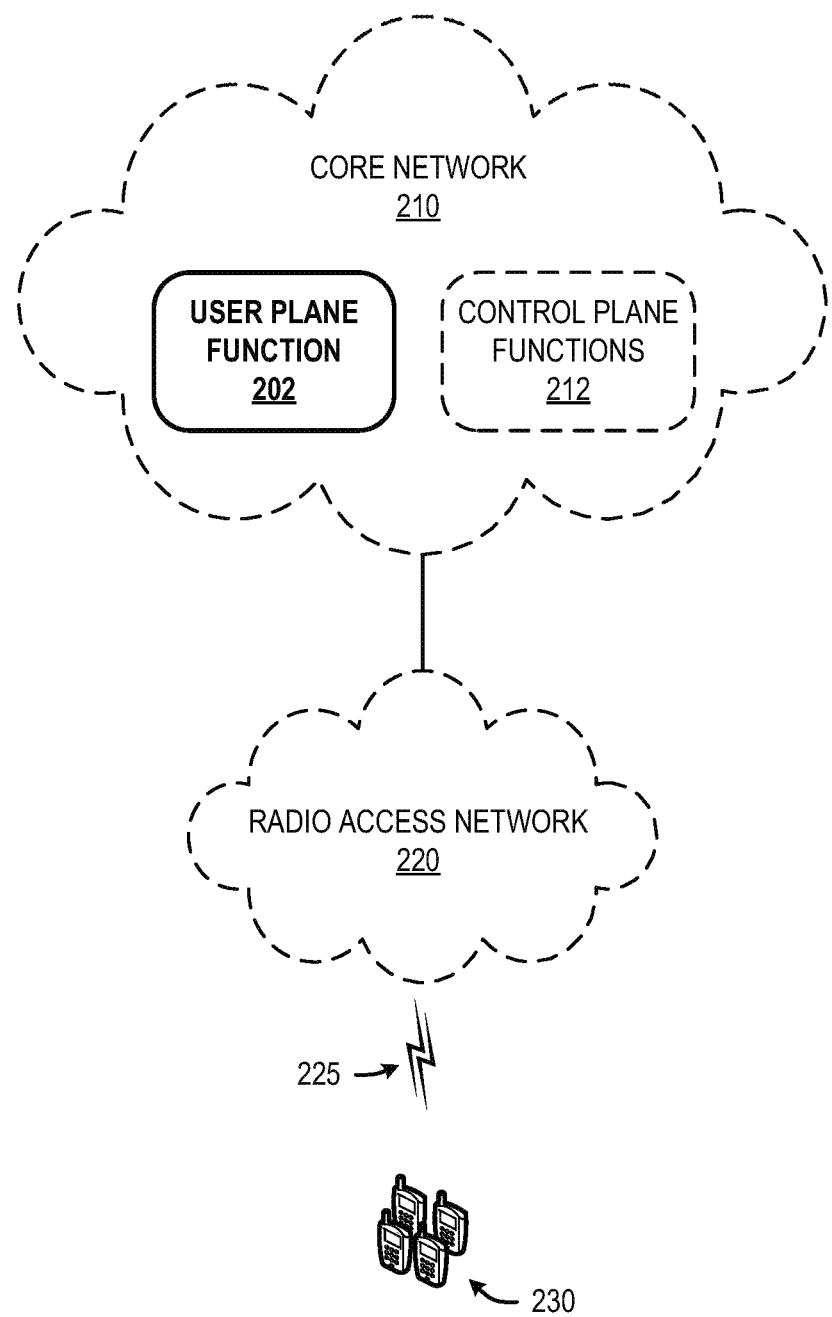
FIGS. 2A-2B respectively depict an example communication network and example UPF comprising an FPGA.
Figure 2B:
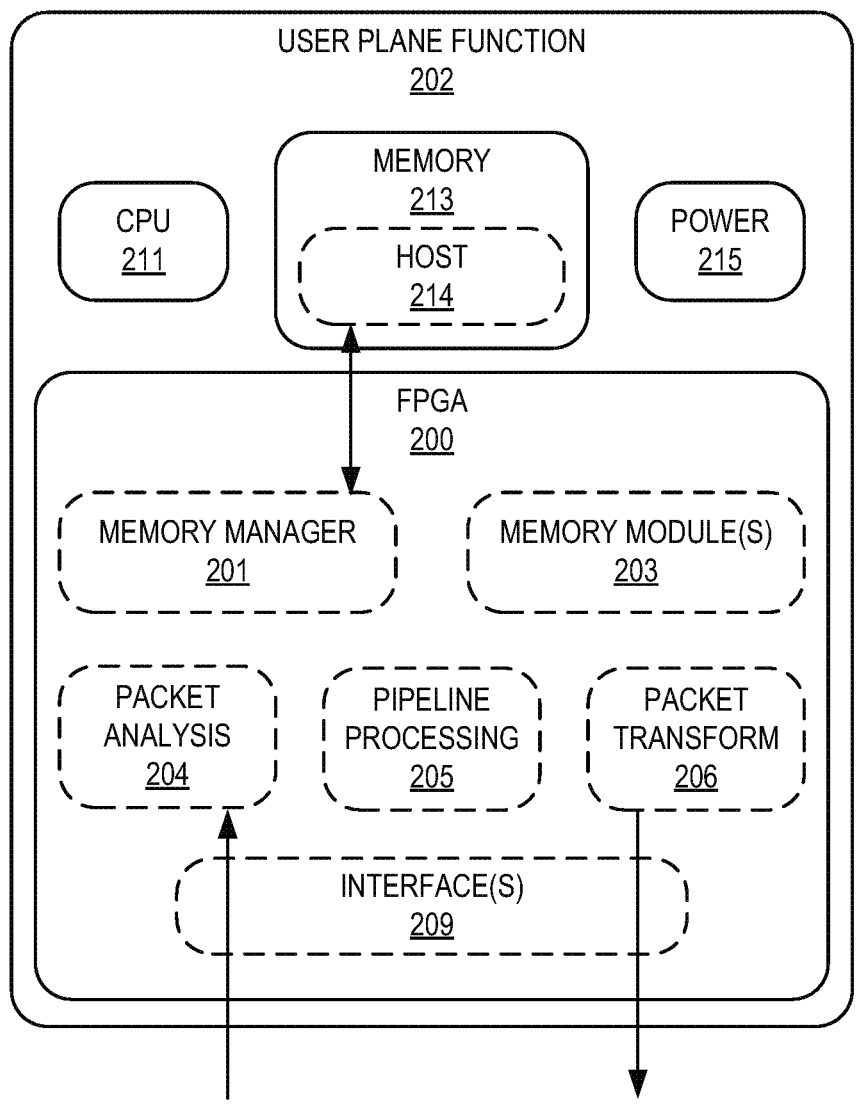

FIGS. 2A-2B respectively depict an example communication network and integrated circuits deployed therein in the form of a UPF 202. With reference to FIG. 2A, a user plane function 202 is illustrated as being within a core network 210 coupled to a radio access network (RAN) 220 that serves wireless devices 230 over communication links 225. For example, the wireless devices 230 can be end-user wireless devices (e.g. UEs), communication links 225 use 5G NR, 4G LTE, or any other suitable type of ratio access technology (RAT), and core network 210 can be structured using a service-based architecture (SBA) utilizing core network functions and elements, including user plane functions 202 and control plane functions 212. The RAN 220 can include various access network functions and devices disposed between the core network 210 and the end-user wireless devices 230. For example, the RAN 220 includes at least an access node (or base station), such as an eNodeB and/or a next generation NodeB (gNodeB) communicating with a plurality of end-user wireless devices 230. It is understood that the disclosed technology may also be applied to communication between an end-user wireless device and other network resources, depending on the RAT and network technology being implemented. Further, either of core network 210 and ratio access network 220 can include one or more of a local area network, a wide area network, and an internetwork (including the Internet) and capable of communicating signals and carrying data, for example, to support voice, push-to-talk, broadcast video, and data communications by end-user wireless devices 230.

UPF 202 and other positions within the illustrated network topology can include programmable network devices (and integrated circuits provided thereon) that enhance or replace the myriad existing packet gateways, such as a CUPS based user plane S-GW, P-GW, or SAE-GW in 4G networks, and user plane functions (UPF) in 50 networks. For example, UPF 202 can perform packet filtration at network edge of each network 210, 220, and deep-packet inspection (DPI) for packets traversing thereto/therefrom private networks, secure fast transfer of detailed instructions (for high-frequency stock trading, for example), and so on. This eliminates having to transport the data packets to central sites or networks, while providing robust and secure filtration of network edges. Further, incorporating data management functions into these programmable networking devices also minimizes the need for extra control plane elements and communication therebetween. Since it is beneficial to have the user plane co-located (or as close as network architecture allows) to the access node, and then directly egress from that user plane to the destination network, this configuration reduces or eliminates extraneous transport of data through the core network.

In one example, UPF 202 can include one or more programmable network devices with a plurality of network functions embedded thereon, including pipeline processing for processing data packets and sessions transmitted through core network 210, as well as offset-based memory management functions described herein. One such example of a programmable networking device includes one or more field programmable gate arrays (FPGAs) configured with a host server (or simply "host") enabling communication with other network devices on different interfaces including control and user interfaces. Such programmable networking devices can perform various functions including data session management, security/firewall, data processing, pre-processing, post-processing, pipeline processing, and data transport and switching functions. Other functions performed by an exemplary UPF 202 include communicating with other network components, such as a controller node, managing health of different network nodes such as eNodeBs, gNodeBs, other components of a UPF, or any network node along the data path, as well as tunnel identification management, session identifier management, receiving control-plane instructions from a session management function (SMF) in the case of 5G, and the SGW-C and PGW-C in the case of 4G, etc. Based on the instructions from the controller node, a host module of the programmable networking device can determine how to process the data sessions associated with the data packets it receives. The host module interacts with an embedded circuit such as an FPGA that is programmed to transmit and receive session data, routing tables, and pipeline processing including updating packet headers, applying quality of service (QoS) policies, and forwarding/transporting the data packets associated with the data sessions, based on the information received from the host module.

Other network elements may be present to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements. For example, many components not specifically shown in FIG. 2 can include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

With respect to FIG. 2B, UPF 202 includes at least a processor 211, a memory 213, a power supply 215, and an FPGA 200. Host server (or "host") 214 is configured to manage data sessions and life cycles associated with data packets that are processed by FPGA 200, and to interface with a control plane network node or gateway. For example, host 214 can receive control-plane instructions from a session management function (SMF), a gateway control plane (SGW-C, PGW-C, or SAEGW-C), or a controller node. Further, host 214 can initiate processes or kernels on CLBs or modules of the FPGA 200, including interfacing with persistent kernels and communicating information about data packets and sessions between the kernels and other network elements. Each kernel or module can communicate with other kernels, and transfer information to and from other kernels. For example, a packet analysis kernel 204 is configured to receive data packets within one or more data streams, and forward the data packets to other kernels, such as pipeline processing kernel 205, etc. Pipeline processing module 205 can perform various operations including applying quality of service (QoS) policies to data packets traversing the user plane, managing data sessions associated with different rules such as guaranteed bit rate (GBR) and maximum bit rate (MBR) and token buckets associated therewith, synchronizing transmission of data packets and control signals with timers at various operational levels, and so on. Packet transformation kernel 206 can modify headers and forward data packets to other network nodes, according to the results from pipeline processing kernel(s) 205 and/or instructions from host 214. Further, interface(s) 209 can include one or more ports associated with different reference points, or configured to communicate with different network nodes or devices, e.g. one or more gateways or functions on the core network, or any other network node on the PDN, including but not limited to application servers, session management, proxy, web server, media server, or end-user wireless devices coupled to another wireless network or RAN. For example, interfaces 209 can include a first set of ports associated with reference points for data transmission between different network nodes, and a second set of ports associated with reference points for control signal transmission between different network nodes. Further, data packets can be any type of data packet that is originated from a source node and destined to a destination node. For example, the data packet can include a data packet associated with a data session on a user plane, or a control data packet, and can be received from any type of network node, including an access node, controller node, gateway, external network node, virtual private network (VPN) node, and so on. As described herein, the data packet can be received via one or more different ports, interfaces, or reference points configured on the programmable networking device.

Further as described above, different types of data packets and sessions necessitate varying levels and types of PDRs, QoS. Thus, packet memory manager 201 performs operations for offset-based memory management to ensure that repeated allocations and deallocations of rules and other functions do not cause excessive fragmentation and can be referenced with minimal processing complexity. For example, a method performed by UPF 202 can include receiving a request at FPGA 200 for allocating a first portion of memory module 203, and determining a first address space for allocating the first portion of the memory module 203 based on one or more offset values that are tracked by memory manager 201. The one or more offset values comprise one or more current allocation offset values or de-allocated offset values. The request can be for one or more PDRs, lookup tables, or other functions associated with UPF 202 described herein. Thus, each request can be for a code segment or portion of memory of a given size, and the allocation size can be an incremental size amount that would fit or accommodate the code for which the allocation is being requested. Using incremental size allocations enables maintaining fewer lists of size-specific offset values in free lists, which may be further referred to when a re-allocation is needed for a subsequent code segment or memory portion. If no de-allocated offset values exist in the free list, an address space for the code can be determined based on a current offset value, which indicates an end-address of the last-allocated portion, or a null value if no previous portions of the memory module 203 have been allocated. The initial base address of the memory module 203 serves as a reference point for any offset values indicating newly allocated, de-allocated, or free portions of the memory module 203. For example, a current allocation offset value is modified to reflect the first address space (i.e. the end or "head" of the linked list), and one or more free lists are modified with de-allocated offset values corresponding to previously de-allocated portions, null values. Upon finishing execution of a code segment, completing a packet processing pipeline, expiration of a timer, etc., memory portions that are de-allocated are referenced using de-allocated offset values stored in previously de-allocated portions at the address space (i.e. as a linked list).

Thus, an example method performed by UPF 202 can include storing offset values associated with each of a current allocation of portions of the memory module 203, a last de-allocated portion of the memory module, and previously de-allocated portions of the memory module, updating the offset values associated with the current allocation each time an additional portion of the memory module is allocated, and updating the offset values associated with the last de-allocated portion and the previously de-allocated portions each time an existing portion of the memory module is de-allocated. In this example, requests to allocate the portions of the memory (e.g. for code segments of certain sizes) can be received from host 214, and an allocated size of the portions is a predefined incremental size that is larger than the requested size. The offset values associated with each last de-allocated portion are stored in free lists associated with the predefined incremental size corresponding to each last de-allocated portion, and the offset values associated with each previously de-allocated portion are stored in a respective prior de-allocated portion of the memory module, forming linked lists whereby a small number of offset values are maintained to provide address spaces over the entire memory 203 (as well as modules 204-206). One value is maintained for the current total allocation, one value for each last de-allocated portion of a given size (in the free list associated with each predefined size), and various values for each prior de-allocated portion stored in the subsequently de-allocated portion (of the predefined size), with the last de-allocated portion being referenced by its respective offset value in the associated free list.

An example method performed in such a system can include initializing the memory manager 201 with a size and a starting address of a memory module 203, receiving a request to allocate a portion of the memory module for a code segment of a given size, determining, based on looking up an offset value in a linked list, whether a past portion of the memory module corresponding to the given size was previously de-allocated, if the offset value exists, allocating the previously de-allocated portion for the code segment and updating the offset value in the linked list, and if the offset value is null, allocating the portion of the memory module for the code segment at the starting address and updating a current allocated offset value.

Figure 3:
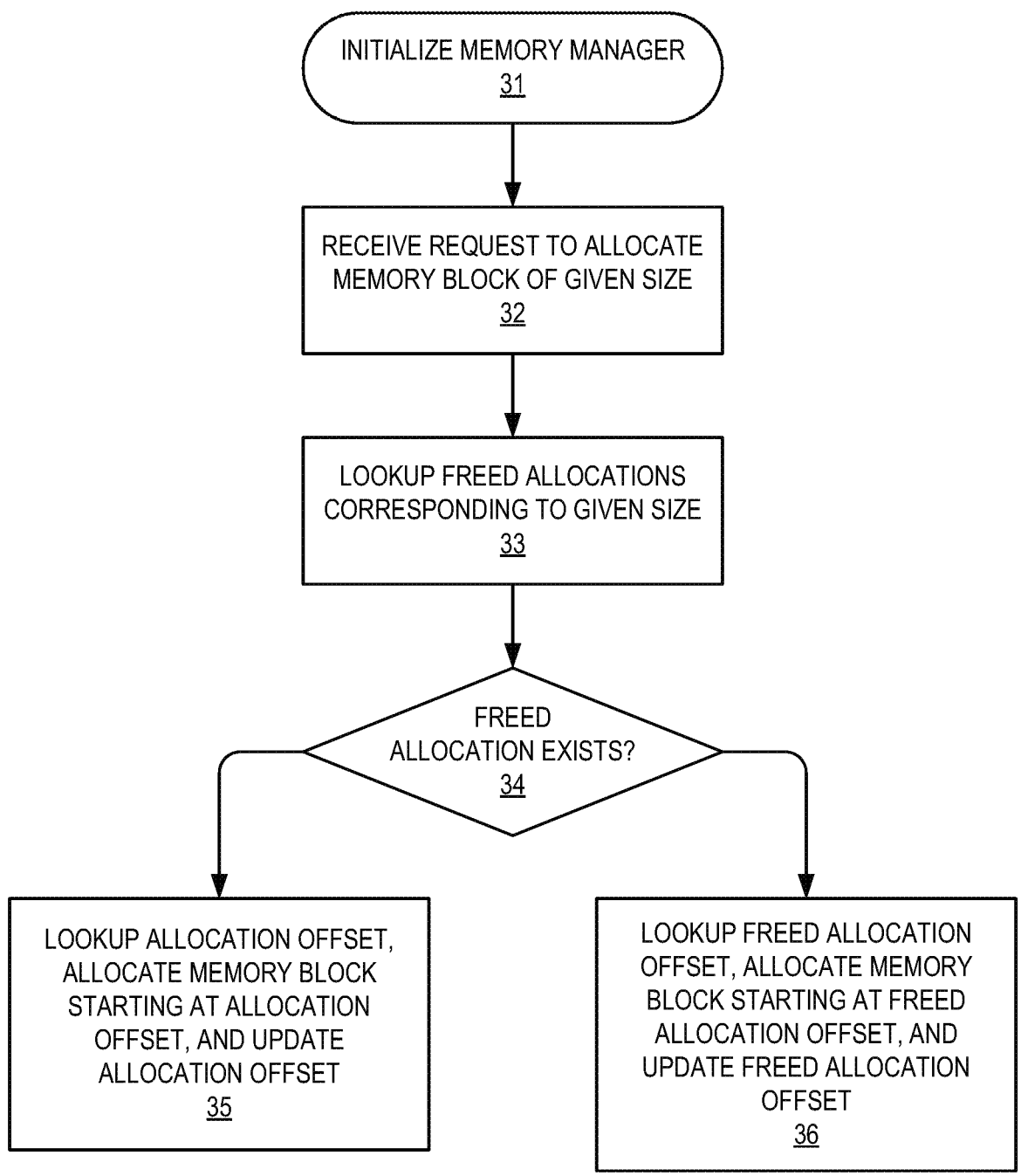
FIG. 3 depicts an example method for offset-based memory management.

FIG. 3 depicts example offset-based memory management operations performed by, for instance, an FPGA or other integrated circuit as described above. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 31 the memory manager is initialized with a memory size, an initial offset value, and one or more free lists associated with size increments and offset values corresponding to freed or de-allocated memory portions. At 32, a request to allocate a memory block of a given size is received at the memory manager of the FPGA. Free lists are referred to in case there exists an offset value for a previously allocated (and now de-allocated) block of the given size. The size may be an incremental size that is the smallest increment sufficient to accommodate the requested portion. At 34-35, if a freed allocation does not exist (i.e. if the memory manager was recently-initialized), an allocation offset is identified to determine where to allocate the requested portion. The allocation offset is correspondingly updated to reflect the new allocation (i.e. the head of the next available allocation). Further, at 34-36 if the freed allocation exists, then the offset value corresponding to the last-deallocated address or offset is used to determine where to allocate the requested portion. The freed allocation offset (e.g. in the list corresponding to the size of the allocation) is updated to reflect the address (i.e. updated offset) for the newly-allocated portion.

Figure 4:
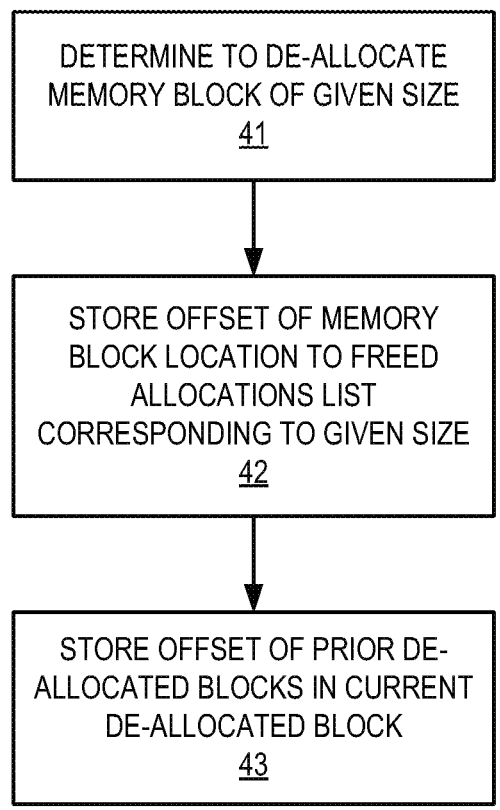
FIG. 4 depicts another example method for offset-based memory management.

FIG. 4 depicts example offset-based memory management operations performed by, for instance, an FPGA or other integrated circuit as described above. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

As described above, a memory manager can be initialized with a size and a starting address of a memory module, and receives requests to allocate and de-allocate portions or "blocks" of the memory module for code segments of given sizes. Thus at 41, a determination is made to de-allocate a memory block of a given size, based on for example expiration of a timer, completion of a task or application, closing of a data session, etc. Then at 42, an offset value of the location/address is stored on the free list corresponding to the given size, and at 43, the offset value of prior de-allocated blocks if any is stored in the currently de-allocated block. For example, a free block offset value corresponding to deallocated block (in the memory address space) can be added to a free list corresponding to a size of the block. Further, offset value(s) associated with any prior free blocks can be stored in the deallocated block. If no prior free blocks exist at the time (e.g. if the memory module is freshly being allocated), then this offset value can be a null value.

Figure 5A:
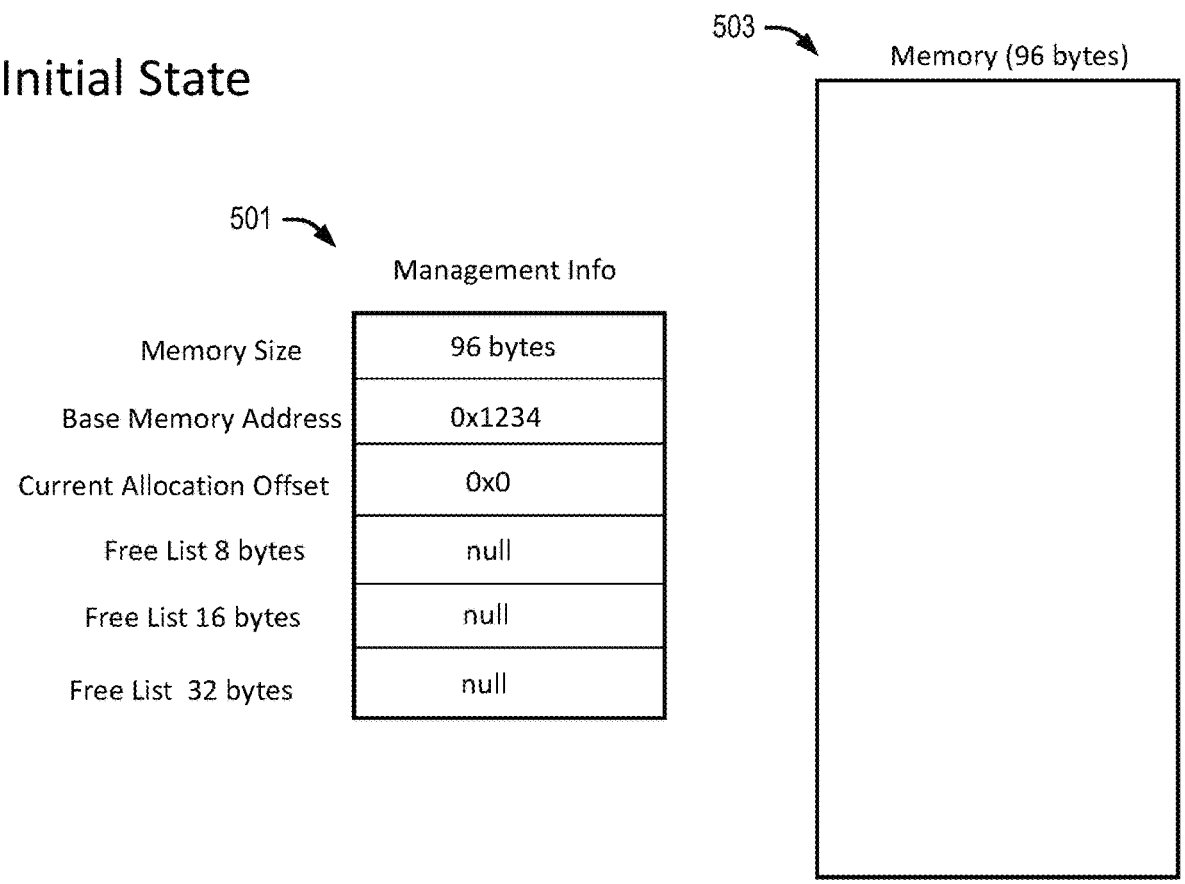
FIGS. 5A-5I depict examples of allocating and de-allocating memory blocks using offsets.

FIGS. 5A-5I depict examples of allocating and de-allocating memory blocks using offsets. The illustrated memory block 503 is 96 bytes in size, and a memory manager (not illustrated herein) stores and updates memory management information 501, including memory size, initial address, current allocation offset, and free lists for 8, 16, and 32 byte allocations. These sizes are simple examples and other configurations of memories, managers, addressing systems/conventions, mapping methods, and incremental sizes can be envisioned by those of ordinary skill in the art, in light of this disclosure. With reference to FIG. 5A, an initial size and address of the memory (e.g. 96 bytes at address 0x1234) is stored, as well as the current offset (for allocated blocks) and a free list to track available blocks to use. The free lists are linked lists initialized as empty.

Figure 5B:
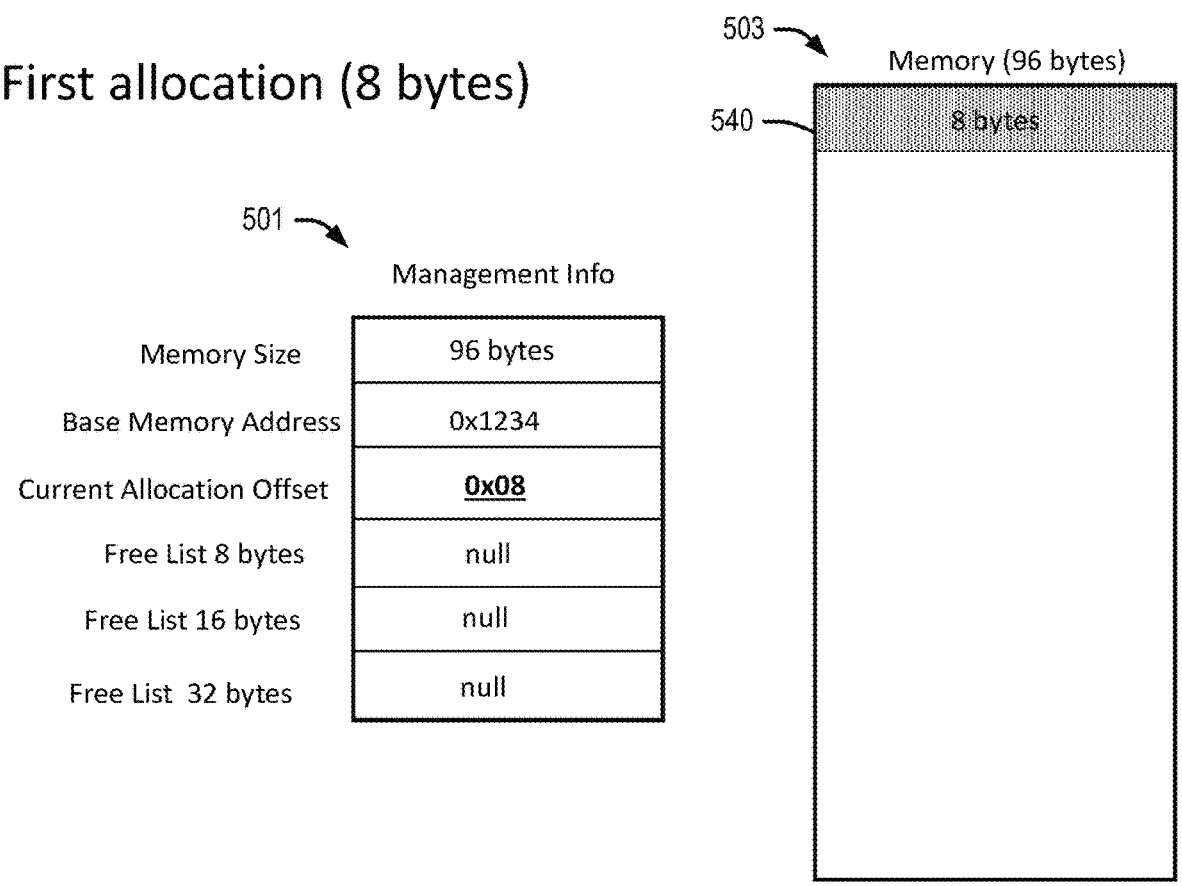
Figure 5C:
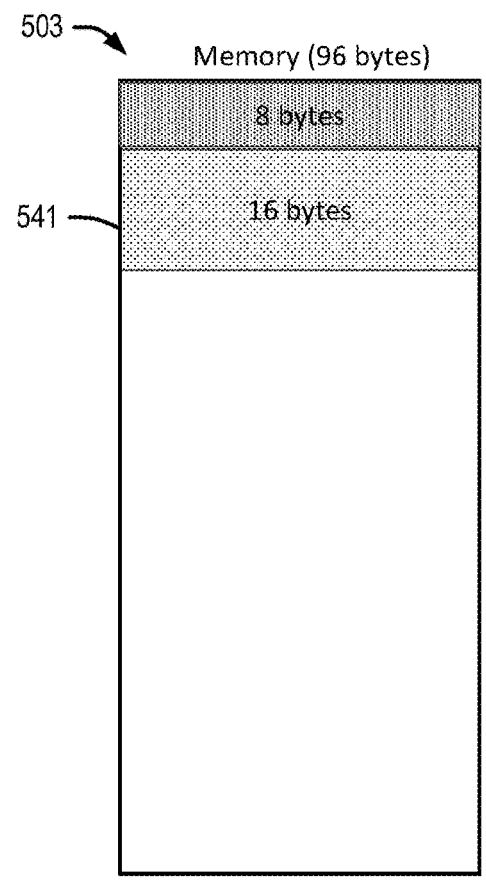
Figure 5D:
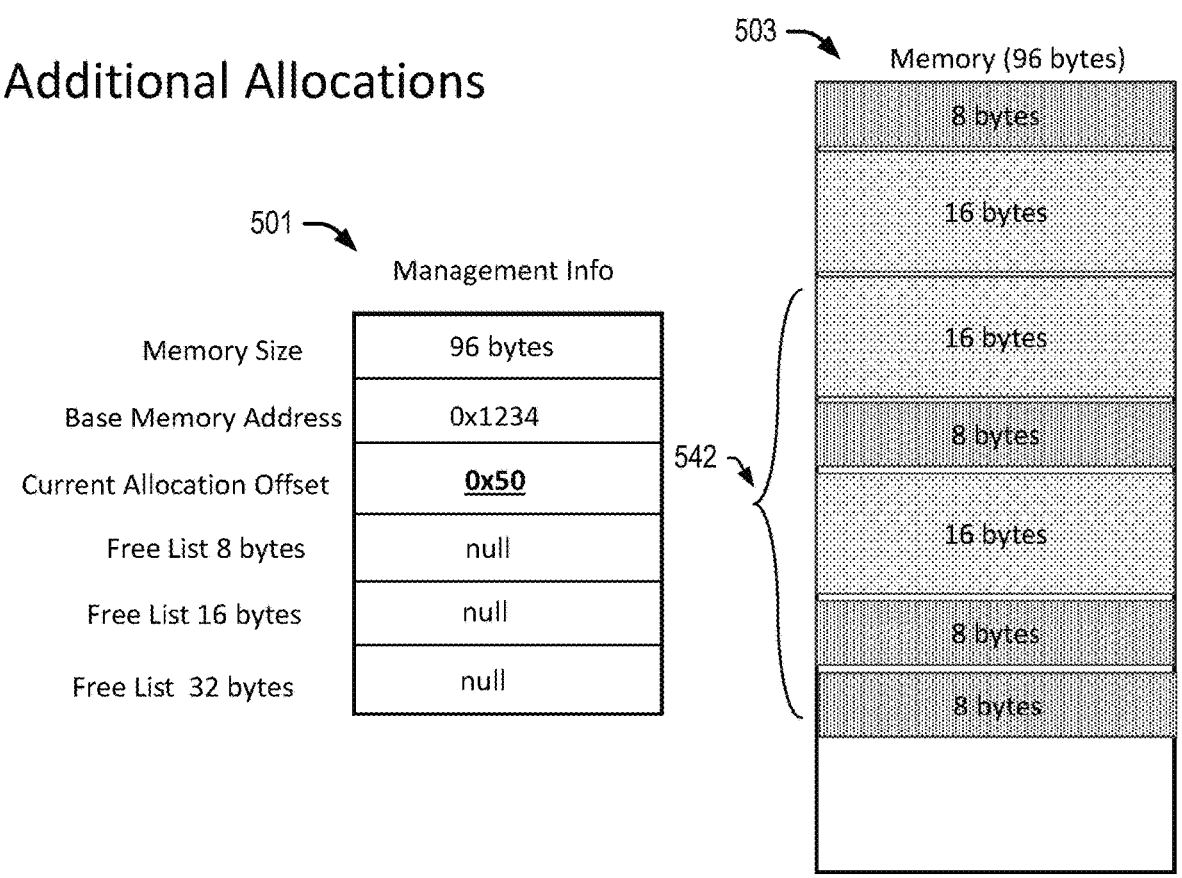
Figure 5E:
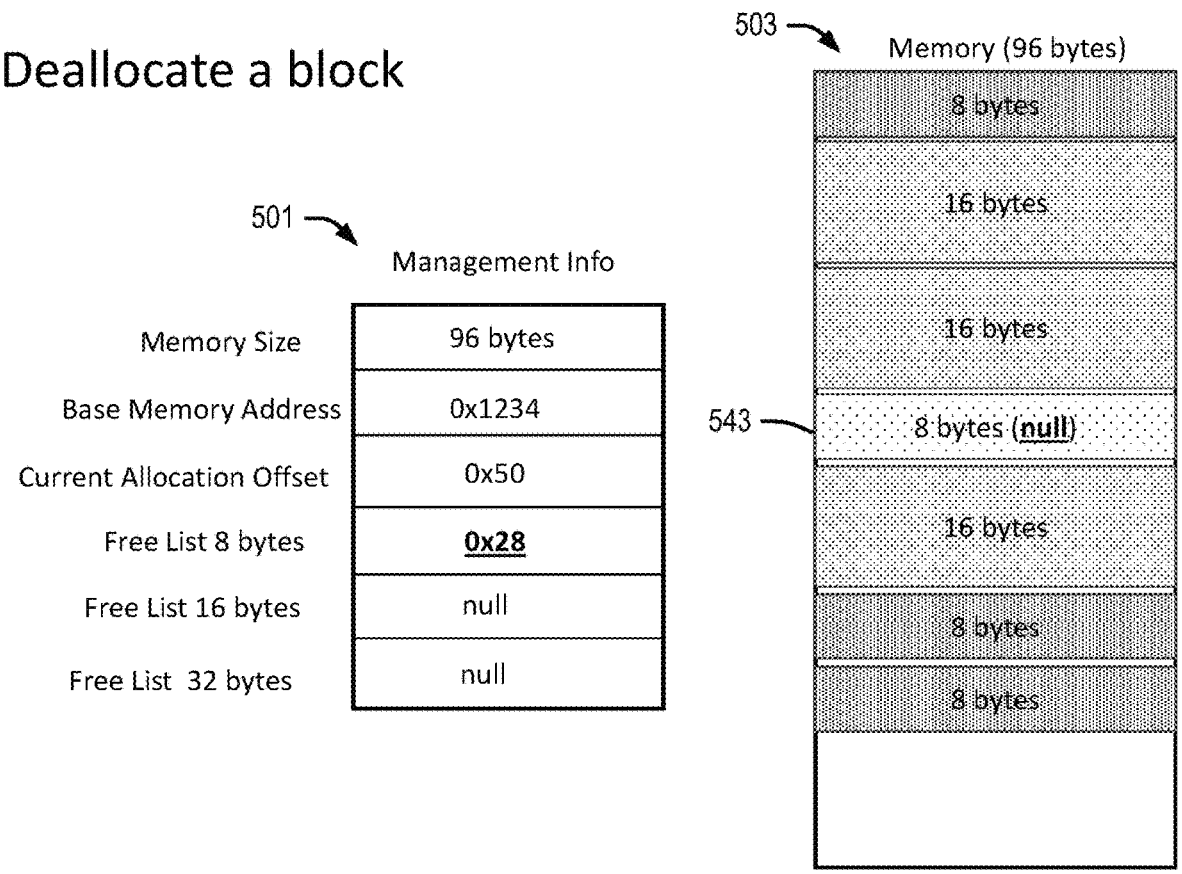

Now, with reference to FIG. 5B, an 8-byte allocation is requested. The offset is updated (in hexadecimal) to 0x08. With reference to FIG. 5C, a 10-byte allocation is requested. The allocated block size is rounded up to the nearest power of 2 size (16 bytes). The offset is updated to 0x18. FIG. 5D shows that additional allocations have been made, and the offset updated (now, to 0x50). Now, with reference to FIG. 5E, An 8-byte block has been de-allocated. An offset value corresponding to the address of the de-allocated block is added to the 8-byte free list. Further, an offset to the next de-allocated item in the list (in this case null) is stored at the address of the de-allocated portion itself (thereby forming a linked list).

Figure 5F:
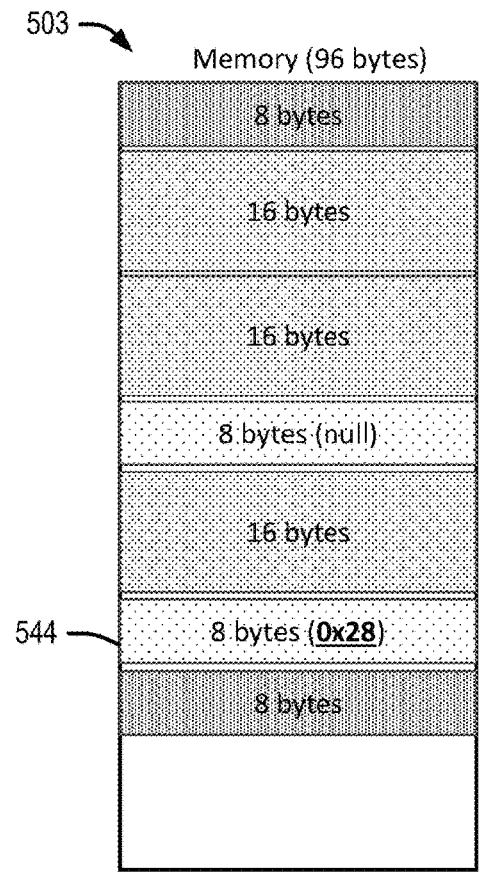
Figure 5G:
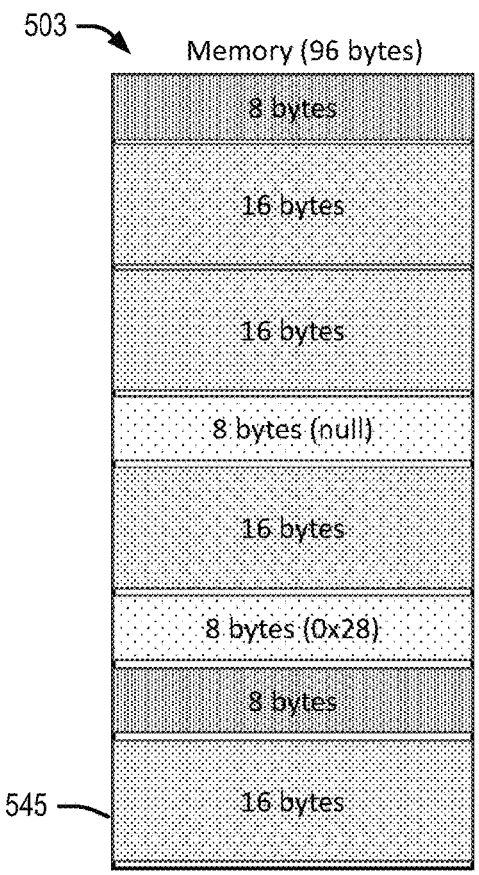
Figure 5H:
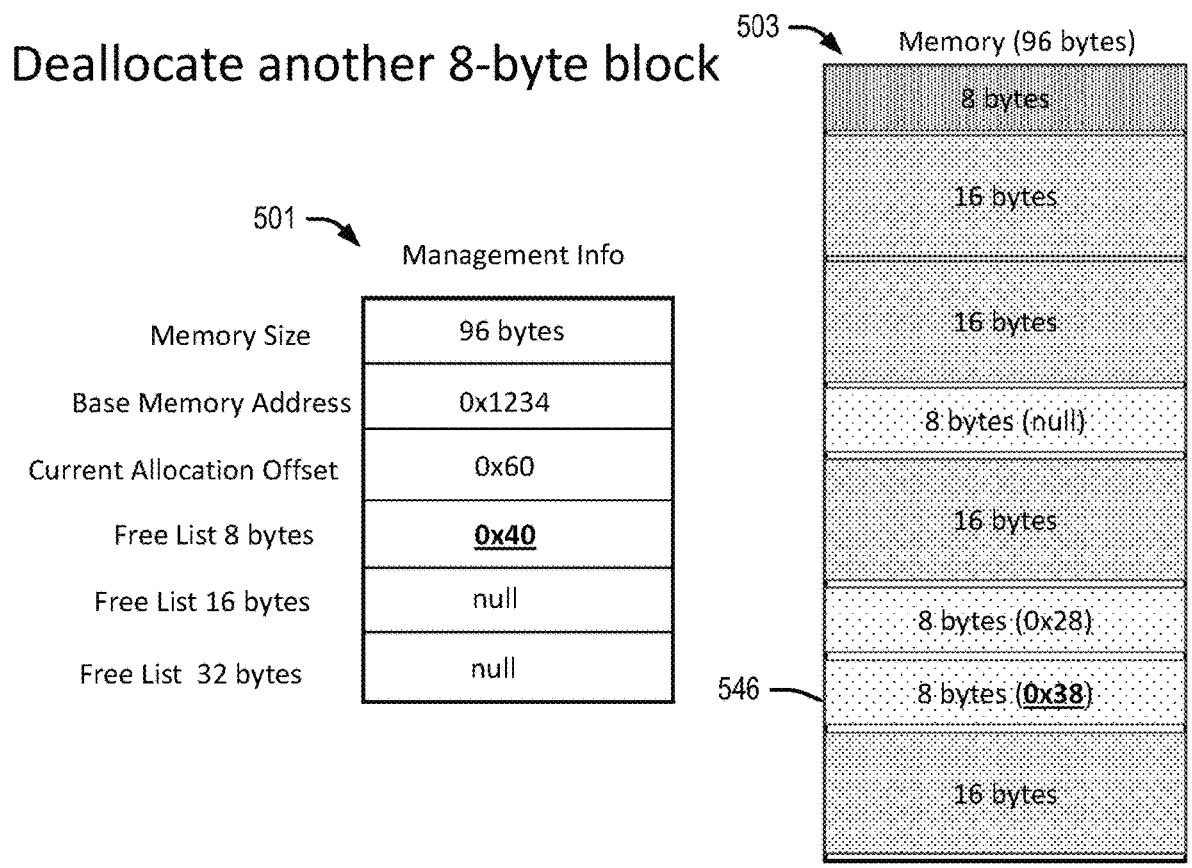
Figure 5I:
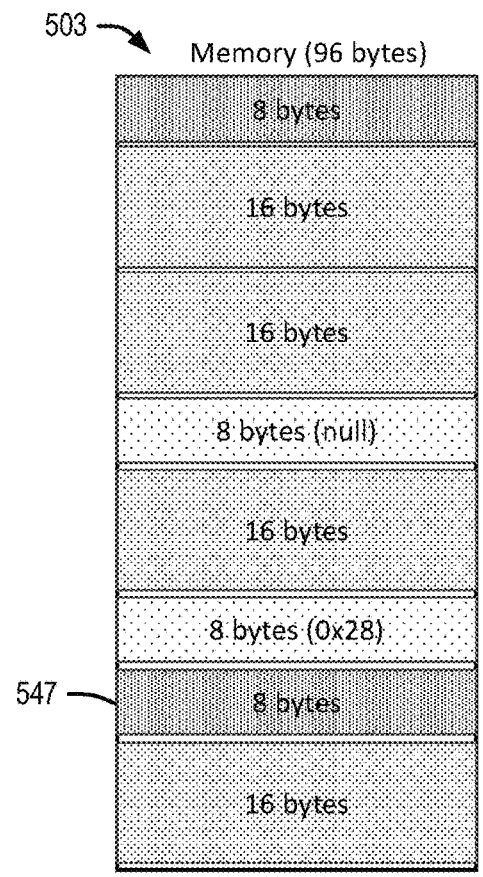

So, with reference to FIG. 5F, another 8-byte block has been deallocated. A de-allocated block offset value is added as the head of the 8-byte free list, and an updated free offset value is added to the de-allocated portion (in this case, the previous offset of 0x28). Additional allocations of different sizes with the remaining memory are shown in FIG. 5G. Another 8-byte block is deallocated in FIG. 5H, and the free list is updated. There are now 3 items in the free (linked) list at offsets 0x40, 0x38, and 0x28. Eventually, an 8-byte block allocation is requested. The 8-byte free list is checked and the offset is not null, so the offset value in the free list is used for the new allocation. The head of the free list is updated to the previously de-allocated offset value, and now contains 2 items at offsets 0x38 and 0x28.

The sequence of operations described in any combination of FIGS. 5A-5I, is performed in parallel for different sized allocations, different types of allocations, and from different inputs/sources of requests. For example, operations for managing the one or more free lists can be performed in parallel. Further, these sizes are simple examples and other configurations of memories, managers, addressing systems/conventions, mapping methods, and incremental sizes can be envisioned by those of ordinary skill in the art, in light of this disclosure. For example, an FPGA deployed as a UPF in a wireless network may include (or be coupled to) a 32 GB module of RAM. It can be assumed that it will require 8 GB RAM to support 3 million sessions. The maximum number of concurrent sessions of the UPF may be configurable, and generally may hover around 5 million sessions, depending on a capability of adjacent network nodes/devices such as gateways, routers, etc. By the time that several million sessions have been allocated the ratios of the different sizes may be reasonably defined based on usage. Thus, one of the main benefits of this management method is a quantity of each incremental block size does not need to be predefined. An average session may result in creation of an "average" number of each of the different sizes, and systems described herein can calculate an initial number of each of the different sizes at runtime, rather than during compilation or startup.

Further, regardless of implementation, the size-based linked lists and offset based allocation and de-allocation uses very little space, with simply moving/copying a few offset values (e.g. integers) around different memory manager lists/tables, responsive to what is currently being allocated or deallocated by other network nodes or devices. These devices and methods are more efficient than previous methods practiced on FPGAs particularly when increasing numbers of blocks are being allocated and deallocated (as is common in modern data networks, what with session management of data and packet flows and so on).

In light of this disclosure, it will be evident to those having ordinary skill in the art that any specialized circuits including FPGAs, GPUs, ASICs, and other types of processors, can be configured to perform the memory management, data processing, pipeline processing and other logic described herein. Further, the exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A system, comprising:
   an integrated circuit comprising a plurality of logical modules; and
   a memory module coupled to the integrated circuit,
   wherein at least one of the plurality of logical modules of the integrated circuit is configured to perform operations comprising:
      storing offset values associated with each of a current allocation of portions of the memory module, a last de-allocated portion of the memory module, and previously de-allocated portions of the memory module;
      updating the offset values associated with the current allocation each time an additional portion of the memory module is allocated; and
      updating the offset values associated with the last de-allocated portion and the previously de-allocated portions each time an existing portion of the memory module is de-allocated.

2. The system of claim 1, wherein the operations further comprise receiving requests to allocate and de-allocate portions of the memory module.

3. The system of claim 2, wherein the requests to allocate the portions of the memory are for code segments of a requested size, and an allocated size of the portions is a predefined incremental size that is larger than the requested size.

4. The system of claim 3, wherein the offset values associated with each last de-allocated portion is stored in a free list associated with the predefined incremental size corresponding to each last de-allocated portion.

5. The system of claim 4, wherein the offset values associated with each previously de-allocated portion are stored in a respective prior de-allocated portion of the memory module.

6. The system of claim 2, wherein the requests are received by a host module coupled to the integrated circuit.

7. The system of claim 1, wherein the integrated circuit comprises a field-programmable gate array (FPGA).

8. A method, comprising:
   storing offset values associated with each of a current allocation of portions of the memory module, a last de-allocated portion of the memory module, and previously de-allocated portions of the memory module;
   updating the offset values associated with the current allocation each time an additional portion of the memory module is allocated; and
   updating the offset values associated with the last de-allocated portion and the previously de-allocated portions each time an existing portion of the memory module is de-allocated.

9. The method of claim 8, wherein the operations further comprise receiving requests to allocate and de-allocate portions of the memory module.

10. The method of claim 9, wherein the requests to allocate the portions of the memory are for code segments of a requested size, and an allocated size of the portions is a predefined incremental size that is larger than the requested size.

11. The method of claim 10, wherein the offset values associated with each last de-allocated portion is stored in a free list associated with the predefined incremental size corresponding to each last de-allocated portion.

12. The method of claim 11, wherein the offset values associated with each previously de-allocated portion are stored in a respective prior de-allocated portion of the memory module.

13. The method of claim 9, wherein the requests are received by a host module coupled to the integrated circuit.

14. The method of claim 8, wherein the integrated circuit comprises a field-programmable gate array (FPGA).

15. A non-transitory computer readable medium storing instructions executed by a processor to perform operations comprising:
   storing offset values associated with each of a current allocation of portions of the memory module, a last de-allocated portion of the memory module, and previously de-allocated portions of the memory module;
   updating the offset values associated with the current allocation each time an additional portion of the memory module is allocated; and
   updating the offset values associated with the last de-allocated portion and the previously de-allocated portions each time an existing portion of the memory module is de-allocated.

16. The computer readable medium of claim 15, wherein the operations further comprise receiving requests to allocate and de-allocate portions of the memory module.

17. The computer readable medium of claim 16, wherein the requests to allocate the portions of the memory are for code segments of a requested size, and an allocated size of the portions is a predefined incremental size that is larger than the requested size.

18. The computer readable medium of claim 17, wherein the offset values associated with each last de-allocated portion is stored in a free list associated with the predefined incremental size corresponding to each last de-allocated portion.

19. The computer readable medium of claim 18, wherein the offset values associated with each previously de-allocated portion are stored in a respective prior de-allocated portion of the memory module.

20. The computer readable medium of claim 16, wherein the requests are received by a host module coupled to the integrated circuit.

* * * * *